Patented Feb. 26, 1946

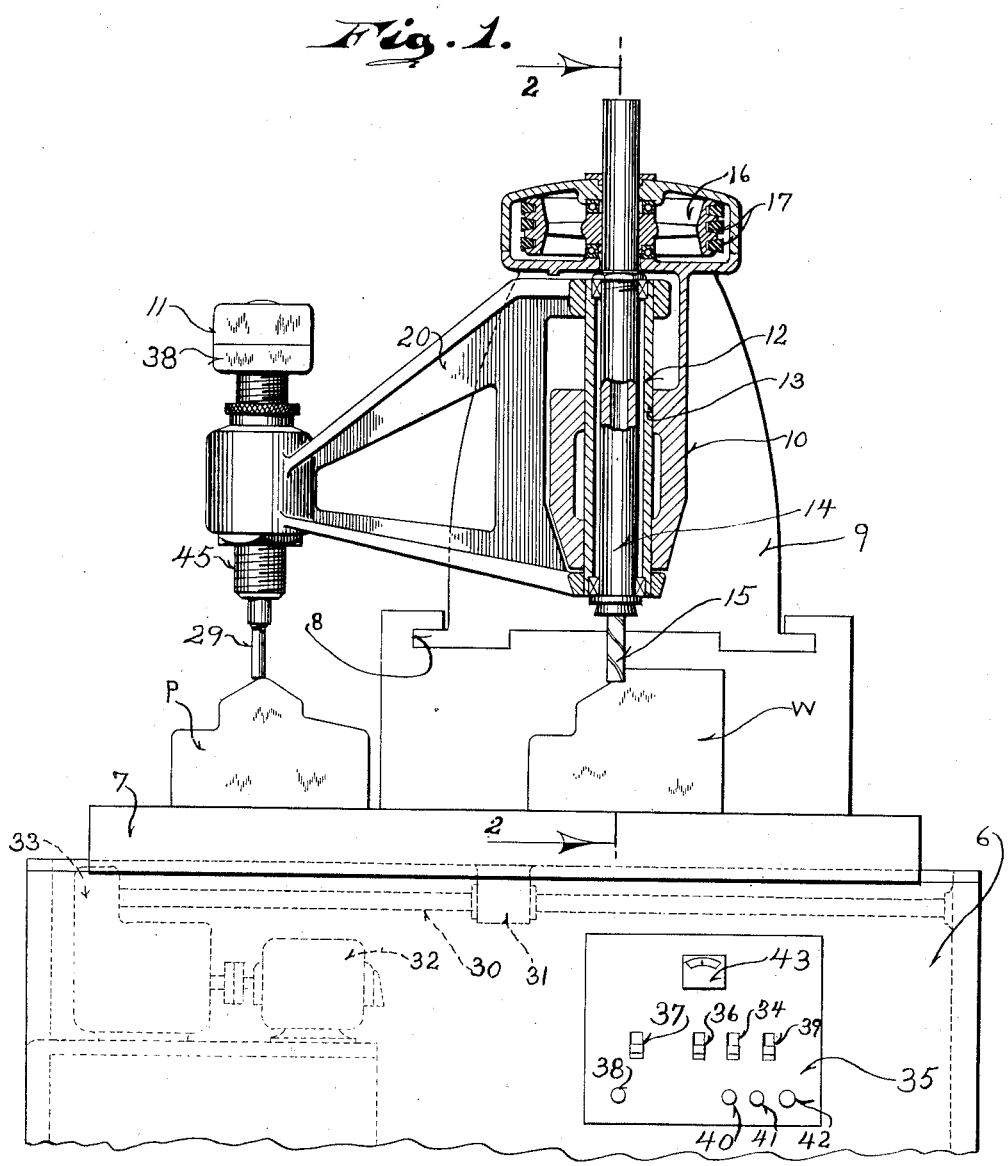

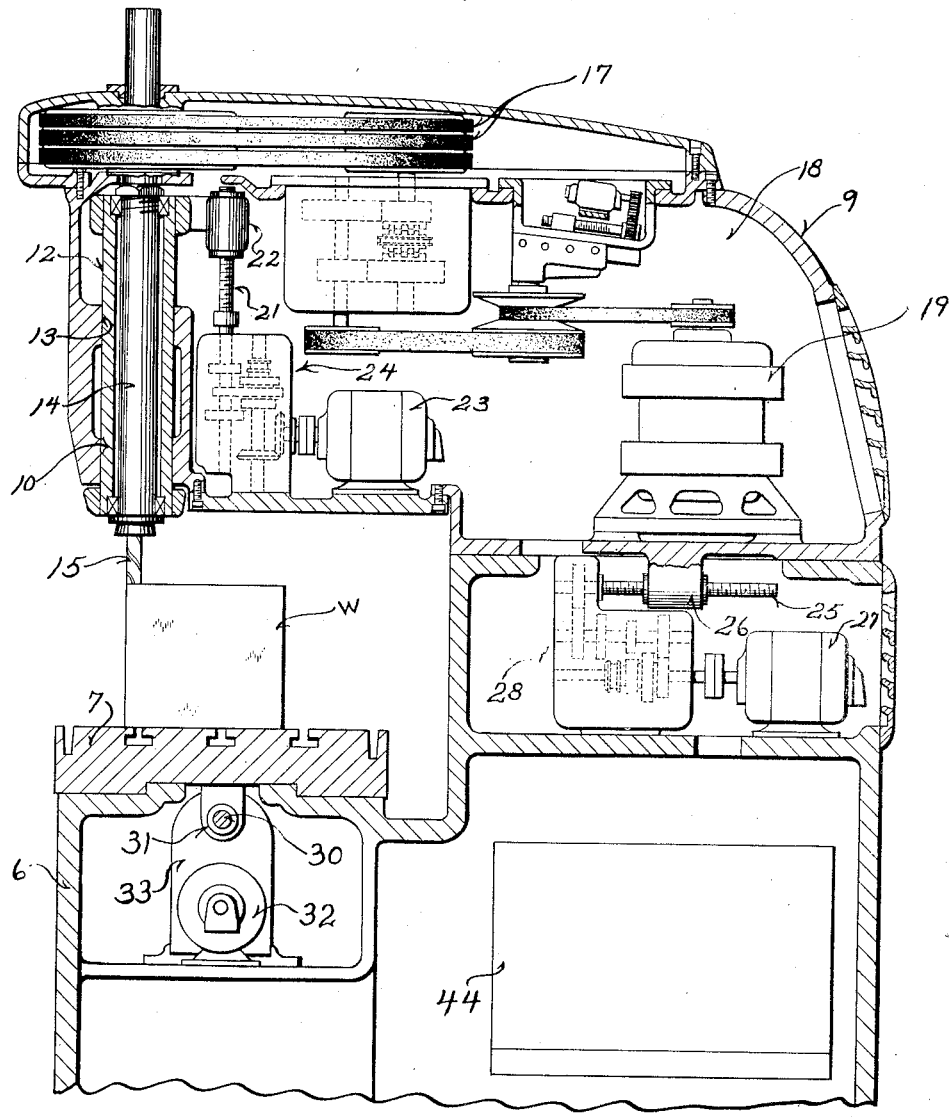

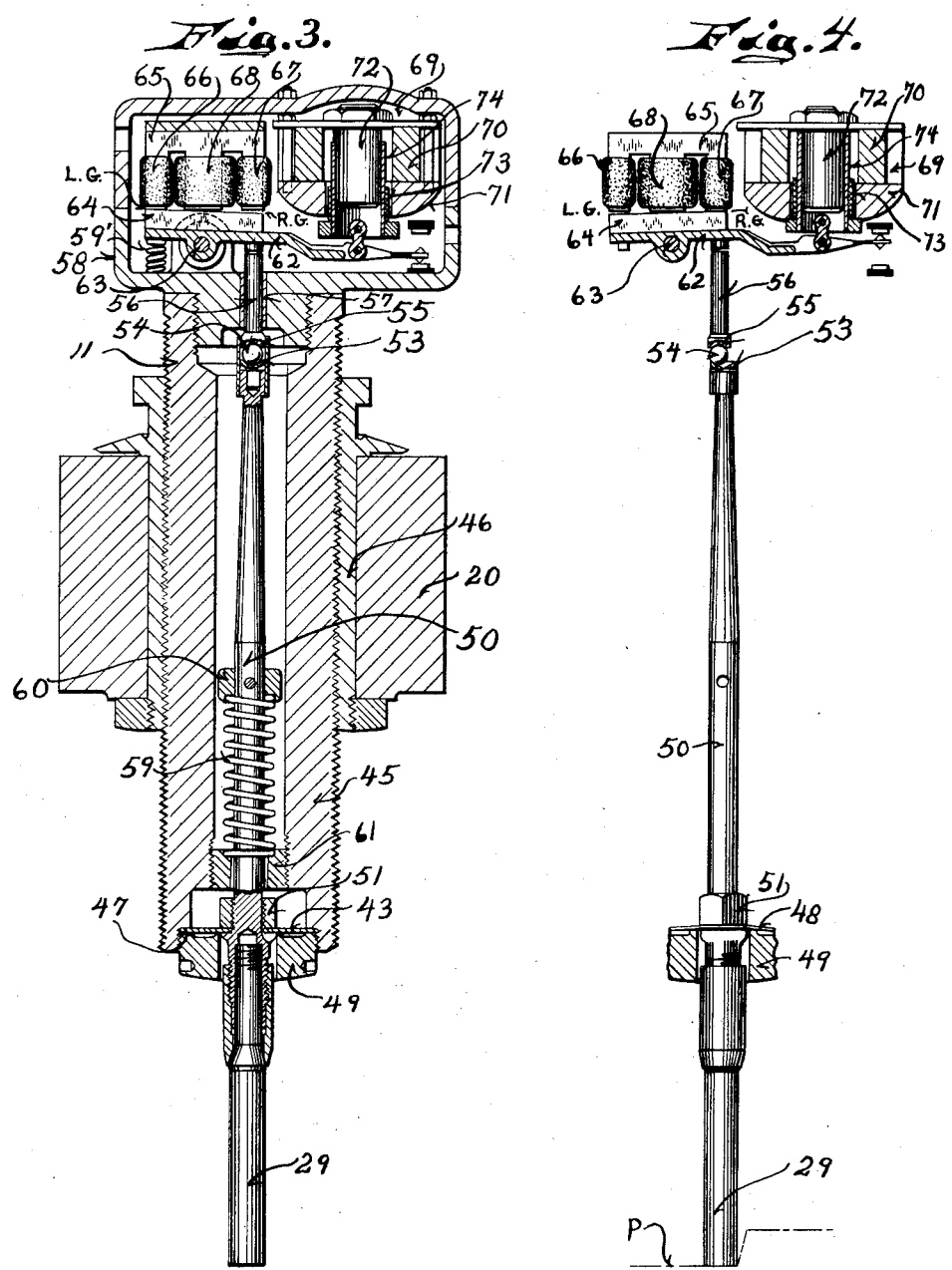

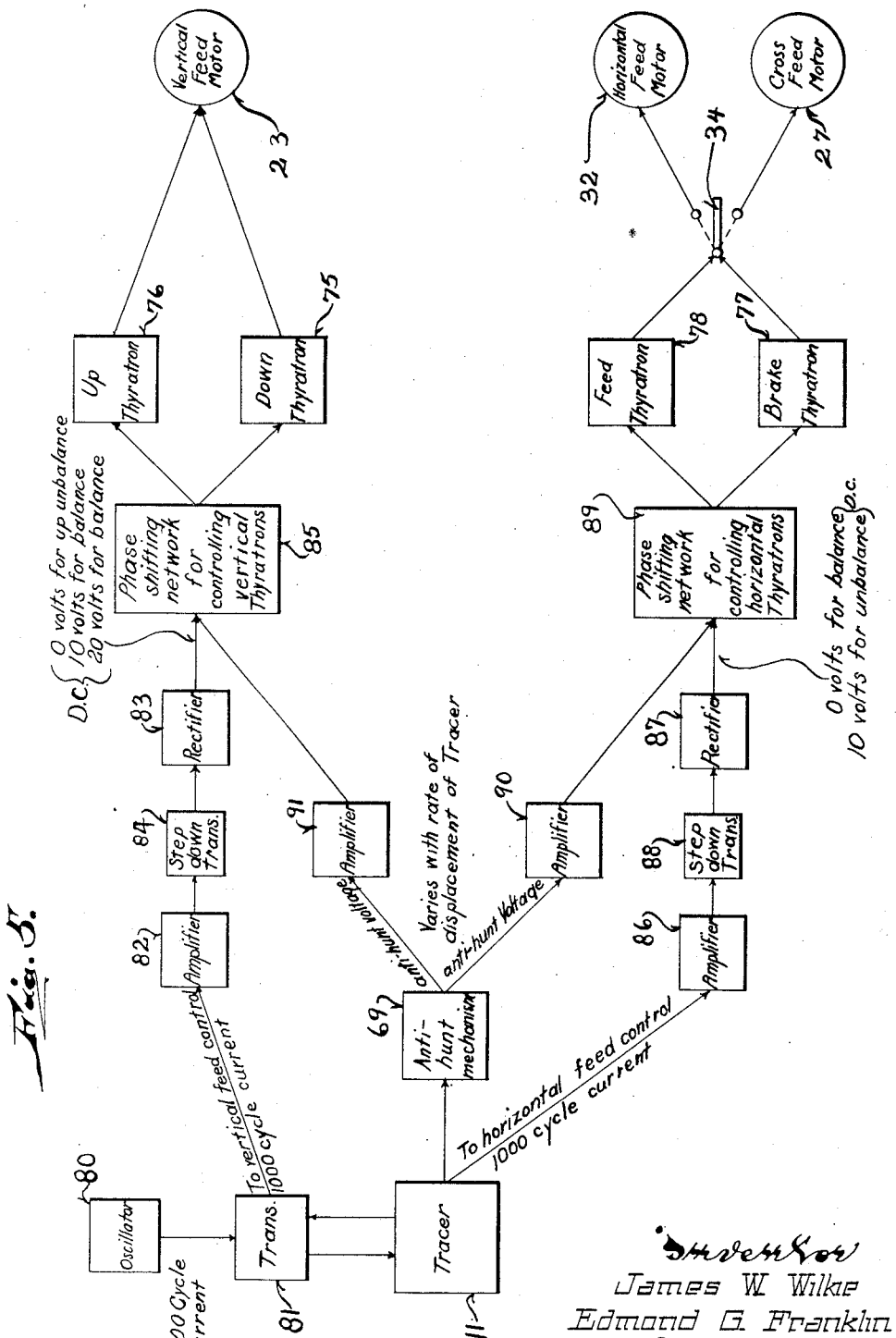

2,395,525

UNITED STATES PATENT OFFICE 2,395,525

TRACER CONTROL

James W. Wilkie and Edmond G. Franklin, Minneapolis, Minn., assignors to Continental Machines, Inc., Minneapolis, Minn., a corporation of Minnesota Original application March 20, 1941, Serial No. 384,342. Divided and this application September 18, 1943, Serial No. 502,902

4 Claims. (Cl. 90—62)

This invention relates to automatic, pattern following control mechanisms and refers particularly to the tracer of a duplicating machine and is a division of copending application, Serial No. 384,342, filed March 20, 1941.

As is well-known to those skilled in the art to which this invention appertains, the tracer follows the surface of the pattern, and a cutter or tool controlled by instrumentalities governed by the tracer shapes the work piece in conformity with the pattern.

Considerable difficulty has been experienced in the past in machines of this type for the reason that the control mechanism was unable to translate the dictation of the tracer into proper relative adjustment between the cutter and work with sufficient rapidity to achieve the desired accuracy without hunting. As a result, duplicating machines heretofore in use have been subject to the objection of producing a step-like cut which only approximated the pattern.

It is, therefore, an object of the present invention to provide an improved control especially adapted for use with duplicating machines which is electrically controlled and operated for the reproduction of a pattern form or template and wherein a tracer of novel and improved design and construction governs the control in a manner to insure the contour of the pattern or template being reproduced with a continuous smooth stepless cut.

Another object of this invention is to provide a tracer for a duplicating mechanism of the character described which is sufficiently sensitive to enable the use of a pattern of relatively soft material such as plaster of Paris while the work being controlled is done on much harder material such as steel.

While an electrical control of the character here employed (and claimed in the aforesaid parent application, Serial No. 384,342) is substantially instantaneous in its response, the electric drive motors have an inherent response lag which if not compensated, would vitiate to an extent the accuracy of the control.

It is therefore, another object of this invention to provide means incorporated in the tracer for accelerating the correction when required to accurately follow the dictation of the tracer.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention, constructed in accordance with the best mode so far devised for the practical application of the principles thereof, and in which:

Figure 1 is a front view of a duplicating machine having portions thereof broken away and in section, and illustrating one application of this invention;

Figure 2 is a cross-sectional view through the duplicating machine taken on the plane of line 2—2 in Figure 1;

Figure 3 is an enlarged longitudinal sectional view through the tracer head;

Figure 4 is a view diagrammatically illustrating the manner in which lateral or sidewise displacement of the tracer stylus is translated into motion on the part of the controlling element of the electrical system; and Figure 5 is a block diagram of the entire control system.

Referring now particularly to the accompanying drawings, in which like numerals indicate like parts, it will be seen that the invention has been illustrated in association with a duplicating machine which is essentially a vertical milling machine. For the sake of simplicity and clarity, many of the mechanical details of this machine have been omitted from the disclosure; and it is to be understood that the machine illustrated is but a representative showing, for the invention is not limited to use with duplicating machines of this type, or in fact, with any duplicating machine. It is readily susceptible for use wherever a tracer scanning a pattern is to smoothly and uninterruptedly control mechanism in strict accordance with contour changes in the pattern.

The machine illustrated has a suitable base or pedestal 6 on which a work supporting table 7 is mounted for horizontal reciprocation. At the rear portion of the base is an upright standard or pillar provided with horizontal guideways 8 in which a slide head or carriage 9 is slidably supported to move cross-wise of the table 7.

The slide head or carriage 9 extends forwardly to overhang the reciprocating work table and carries a cutter head 10 and a tracer head 11.

The cutter head 10 comprises a tubular quill 12 slidable in a vertical bore 13 in the front end of the slide head or carriage 9. Within the quill is the spindle 14 of the cutter head to which the cutter or tool 15 is secured in the customary manner. The upper end of the spindle has a drive pulley 16 slidably splined thereto and about which belts 17 are trained to provide a drive for the spindle regardless of the position of vertical adjustment of the cutter head.

The belts 17 are driven through a suitable variable speed transmission indicated generally by the numeral 18, from a spindle drive motor 19 housed within the slide head or carriage 9.

A bracket 20 fixed to the upper and lower ends of the quill extends laterally from the cutter head to mount the tracer head 11 and thereby rigidly connect these units for simultaneous vertical adjustment. Such adjustment is effected by means of a feed screw 21 disposed vertically in back of the cutter head assembly and within the slide head or carriage 9.

A nut 22 fixed in a rearwardly extending arm on the bracket 20 is threaded on the feed screw 21 so that rotation of the screw either raises or lowers the connected cutter and tracer heads.

Rotation is imparted to the feed screw 21 from a vertical feed motor 23 connected to the screw 21 through transmission gearing indicated generally by the numeral 24. The motor 23 is of the reversible direct current type and operates at the dictation of the tracer in a manner to be hereinafter described.

The entire slide head or carriage 9 as hereinbefore noted is movable horizontally forwardly and backwardly. Such motion is imparted to the head or carriage by means of a feed screw 25 threaded in a nut 26 fixed to the undersurface of the head or carriage and extending down into the base.

The screw 25 is driven by a direct current reversible motor 27 connected thereto through suitable transmission gearing indicated generally by the numeral 28.

The work supporting table 7 may be of any conventional design and construction and is adapted to have a piece of work W secured thereto in position to be acted upon by the cutter or tool 15.

The pattern P which is to be duplicated is likewise secured to the work table in position to co-act with the stylus 29 of the tracer head. Any suitable means may be employed for securing the work and the pattern to the table, but care must be exercised that their center distance, that is, the distance between the centers of the work and the pattern, is the same as the distance between the centers of the tracer stylus and the cutter or tool.

Also, the work engaging point of the stylus must be the same size and shape as the milling cutter or tool.

Reciprocation of the work table is effected by a long horizontal feed screw 30 disposed longitudinally beneath the work table and journalled in suitable bearings carried by the case.

A nut 31 fixed to the work table is threaded on the screw 30 so that rotation of the screw propels the table to right or left depending upon its direction of rotation. Rotation is imparted to the screw 30 from a direct current reversible horizontal feed motor 32 conveniently located within the base and drivingly connected with the screw through transmission gearing indicated generally by the numeral 33.

Inasmuch as it is common practice to provide machines of this type with limit switches and reversing switches controlled from the motion of the work table for changing the direction of table motion at the proper time and also for effecting lateral indexing or shifting between the tool and the table to cause the tool to traverse the work, no attempt has been made to illustrate these features specifically.

For purposes of illustration, however, the control includes a switch 34 for selectively connecting either the horizontal feed motor 32 or the cross feed or indexing motor 27 with the control.

The switch 34 is part of a control panel 35 by which the operator controls the entire machine. In addition to the switch 34 the panel mounts a main power switch 36 by which the power to the control is turned on and off; a vertical control switch 37 by which the operator may turn on the vertical feed motor to lower the tracer and cutter heads; a push button switch 38 enabling manually controlled elevation of the connected tracer and cutter heads; a horizontal feed motor control switch 39 by which the horizontal feed motor 32 is turned on; and three push button switches, 40, 41 and 42.

The center push button switch 41 is a release switch by which the automatic control is disconnected from the horizontal feed motor enabling said motor to be manually turned on for operation in one direction or the other by means of the push button switches 40 and 42.

Hence, it will be seen that by manual operation of the proper switches the connected cutter and tracer heads may be brought into proper cooperative relationship with the work and pattern.

The panel 35 also mounts an indicator meter 43 which serves to visually indicate the position of the stylus of the tracer head with relation to a neutral balanced position. A deflection of the meter needle to the left indicates that the stylus is out of balance in an upward direction while deflection of the needle to the right indicates an out of balance condition in a downward direction.

The control, that is, the physical components thereof and their wired connections, are preferably encased in a cabinet 44 which may be located wherever desired, but is preferably mounted within the base of the machine.

*Tracer head*

The tracer head comprises a tubular body 45 adjustably secured in the supporting bracket 20 by a sleeve 46 threaded to the tubular body and journalled in the bracket. Hence, through rotation of the sleeve 46, adjustment of the vertical position of the tracer assembly with relation to the cutter head may be effected.

The lower end of the tubular body has a double counterbore providing a horizontal seat 47, against which a flexible diaphragm 48 is clamped by a retaining nut 49 threaded into the outer counterbore. The retaining nut 49 has a central bore through which a stem 50 passes. The stem is secured to the flexible diaphragm by a clamping nut 51 and its lower end carries a chuck by which the stylus 29 is removably secured to the stem.

The diaphragm 48 thus supports the stem and the stylus in a manner permitting limited upward axial movement thereof from a free position shown in Figure 3, as well as limited rocking motion about a pivot lying substantially at the center of the diaphragm.

The stem 50 extends up through the hollow body 45 and at its extreme upper end has a substantially conical socket 53 formed axially therein. A ball 54 seated in this socket and a similar conical socket 55 in the bottom of a vertically reciprocal stem 56 connects the stems in a manner to translate rocking motion of the stem 50 into reciprocation of the stem 56, the stem 56 being constrained to axial motion by a bearing 57. This bearing is mounted in the base of a head 58 secured to the upper end of the body 45.

A compression spring 59 coiled about the lower portion of the stem 50 and confined between a collar 60 fixed to the stem and a spring seat 61 secured in the lower end of the body 45, yieldingly urges the connected stem and stylus upwardly with a force slightly less than that of a spring 59' which applies a downward force on the stylus assembly in a manner to be described. The difference between the upward forces of the two springs is the measure of the contact pressure with which the stylus engages the pattern.

In the free condition of the parts shown in Figure 3, the diaphragm 48 rests on the stop provided by the retaining nut 49 and the stylus is in axial alignment with the stem 56 so that the ball 54 is at the bottom of the conical socket 53. In this position of the parts, the stem 56 obviously is at its lowermost position. Any motion of the stylus either laterally or vertically, produces an upward displacement of the stem 56.

The manner in which axial upward pressure on the stylus transmits such motion to the stem 56, is of course, obvious. In the case of lateral or sidewise displacement, as illustrated in Figure 4 the slight tilting of the stylus and stem 50 causes the ball 54 to ride up the inclined wall of the socket 53 and impart the desired upward motion to the stem 56. When adjusted for use, the tracer stylus is in a neutral or balanced position with the diaphragm lifted slightly from the stop nut 49 so that downward as well as upward, or in other words, negative as well as positive displacement of the stylus is possible. Attention is also directed to the fact that lateral or sidewise displacement is possible at any axial position of the stylus. Hence, a pattern condition which effects both axial and lateral displacement produces a cumulative effect on the control element 56.

This up and down motion of the stem 56 is utilized to control the electrical system that governs the operation of the various drive motors. When the stylus approaches an eminence or upward slope on the pattern, the stem 56 is lifted. Because of the arrangement of the electrical circuit by which the tracer controls the motor that raises and lowers the cutter head, such lifting of the stem 56 causes the cutter-tracer couple to be elevated the same amount as the stylus displacement. This restores the position of the stylus in the tracer head to the normal or balanced position. Should the stylus approach a downward slope, the reverse process takes place, and the cutter-tracer couple descends the proper amount.

If an abrupt shoulder on the pattern is encountered, the sidewise or lateral displacement of the stylus produced thereby shuts off the horizontal feed motor and turns on the vertical feed motor until the connected cutter and tracer heads and, of course, the stylus also, have risen in a straight line to the top of the shoulder.

An abrupt step or depression results in maximum downward displacement of the stylus which simultaneously stops the horizontal table feed and actuates the connected cutter and tracer heads downwardly until the stylus again assumes a balanced position contacting the bottom of the depression or cavity in the pattern.

The vertical displacement of the stem 56 in response to the described displacement of the stylus, as clearly shown in Figures 3 and 4, is translated into an up and down oscillating motion on the part of a lever 62, pivoted as at 63, to the base of the head 58. The spring 59' acts against this lever to rock the same about its fulcrum in a clockwise direction to react against the upward force imposed on the stylus assembly by the spring 59.

Balanced above its pivot or fulcrum 63, the lever 62 carries a rectangular laminated armature 64 which forms part of a variable gap control transformer 65. The core of this transformer is made up of E-shaped laminations and is mounted with the open side of the E facing downward to be closed by the armature 64. When the armature 64 is in a neutral horizontal position the gap between it and both ends of the E-shaped core is one-thousandth of an inch (.001").

For the armature to occupy its neutral position requires the stylus to be lifted to a point exactly midway of its range of controlling displacement. Hence, either end pressure or side pressure on the stylus closes the right hand gap RG and increases the left hand gap LG, whereas descent of the stylus from its neutral position results in a reverse condition at the gaps so that when the tracer finger hangs free the left hand gap LG is closed while the right hand gap RG is open.

On each leg of the control transformer 65 is a coil. The coils mounted on the outside legs in the particular embodiment of the invention disclosed, have eighty-five (85) turns. The left hand coil is designated 66 and the right hand coil 67. The center coil 68 which will be referred to hereinafter as the tracer pick-up coil has two thousand eight hundred ninety (2890) turns.

The two outside coils, 66 and 67 are connected in series in such a manner that they circulate flux through the armature in the same direction at any given instant, and they constitute the excitation windings of the control transformer being supplied with alternating current, one thousand (1,000) cycles, in a manner to be described.

If the armature is in its neutral position so that both air gaps LG and RG are equal, no voltage will be induced in the tracer pick-up coil 68. If, however, the armature is unbalanced so that one gap is wider than the other, an E. M. F. is induced in this coil, the magnitude of which is proportional to the amount of unbalance of the armature, being maximum when one gap is zero.

The phase of the voltage induced in the tracer pick-up coil is determined by the direction of unbalance. During an upward condition of unbalance when the gap RG is closed, the voltage induced in the core will be 180° out of phase with the voltage induced therein during a downward condition of unbalance when the gap LG is closed. This change in phase may be used to determine the direction of unbalance of the tracer in the manner described and claimed in the aforesaid parent application, Serial No. 384,342, and in so doing, may be utilized to control the drive motors, as required to have the tracer accurately follow the pattern.

The up and down motion of the lever 62 is also utilized to generate an E. M. F. in an anti-hunt mechanism designated generally by the numeral 69 for the purpose of more accurately keeping the drive motors in step with the dictation of the tracer finger. This anti-hunt mechanism includes a circular magnet 70, with a ring-like pole piece 71 mounted in a fixed position, in any suitable manner, within the head 58 above the outer free end of the lever 62. A central cylindrical core or pole piece 72 extends down into the ring shaped pole piece 71 and is encircled by a coil 73 mounted on an insulated guide tube 74 which slides on the core 72.

The lower end of the tube 74 is connected to the free end of the lever 62 so that up and down motion of the lever slides the coil up and down in the bore of the pole piece 71, to generate an E. M. F. in the coil of a magnitude depending upon the rate of displacement of the coil. The coil 73 will be referred to hereinafter as the anti-hunt coil and it is to be borne in mind that the magnitude of the E. M. F. induced therein is dependent upon the rate of displacement of the coil.

Thus, whenever the pattern is an uninterrupted horizontal plane so that the stylus remains in its neutral position there is no E. M. F. induced either in the tracer pick-up coil 68 or in the anti-hunt coil 73. Any change in the pattern from this horizontal plane results in displacement of the stylus from its neutral position one way or the other to induce an E. M. F. in the tracer pick-up coil 68. If the rate of change called for by the pattern is slight so that rapid correction is not required, no appreciable voltage will be induced in the anti-hunt coil, but on the other hand, if an abrupt rise or descent is encountered so that rapid correction is required, the relatively faster displacement of the stylus, and consequently, the anti-hunt coil, induces a greater voltage in the anti-hunt coil which is used to accelerate the correction through the medium of the electrical control mechanism which forms the subject matter of the parent application, Serial No. 384,342.

Control system generally

The basic problem in a duplicator is to control and coordinate the speed of the vertical feed motor (which effects relative vertical adjustment between the table on which the work and pattern are mounted and the cutter and tracer heads) with the speed of either the horizontal feed motor or the cross feed motor (which reciprocate and index the table, respectively) to cause the tracer to follow the pattern. This is accomplished by a method which is, in effect, the equivalent of inserting resistance in the armature circuits of the motors, all of which, as already noted are shunt wound direct current motors with separate field excitation. Grid controlled rectifier tubes commonly called Thyratrons are used for this purpose.

These Thyratrons are used as half wave rectifiers to supply direct current from an alternating current source to the motor armatures. The average current through a Thyratron is controlled by controlling the time of starting of its anode current in each positive half cycle. This is done by applying alternating current to the grid and plate of the Thyratron simultaneously and by controlling the phase relation of this plate and grid voltage.

When the grid voltage is in phase (zero phase angle) with the plate voltage, the Thyratron will be conducting over the entire half cycle that its plate is positive. When the grid voltage is 180° out of phase with the plate voltage, the tube is non-conducting over the entire half cycle that its plate is positive. For an intermediate phase angle of 90° the tube will be conducting over approximately one-half the half cycle that its plate is positive.

It is, therefore, the phase angle between the plate and grid voltages which determines the portion of the positive half cycle that the tube is conducting, and consequently, the average current passed by the tube. Thus, by controlling the phase angle between zero and 180° the tube can be controlled from full on to full off and the motor speed will vary accordingly from full speed to zero.

Referring now to the block diagram Figure 5, it will be seen that the vertical feed motor 23 is controlled by two Thyratrons; one the "down" Thyratron 75 which controls the speed of the vertical feed motor during downward adjustment of the tracer and the other the "up" Thyratron 76 which controls the speed of the vertical feed motor during upward adjustment of the tracer.

It will also be seen that the horizontal feed motor and the cross feed motor are controlled by two Thyratrons 77 and 78. Thyratron 78 controls the speed of the horizontal and cross feed motors during the actual feeding or travel of the table. The other provides in effect a brake to prevent over-travel of the motor driving the table. The output of these two Thyratrons, 77 and 78, is selectively connectible to either the horizontal feed motor or the cross feed motor by means of the switch 34.

The manner in which the various Thyratrons respond to the dictation of the tracer will now be briefly outlined with reference to the block diagram, Figure 5. As here shown, an oscillator 80, supplies alternating current to the primary of the transformer 81. The current supplied by the oscillator has a frequency of 1000 cycles. The transformer has two secondary windings, one supplying current to the excitation coils of the tracer and the other supplying an amplifier 82.

If the system is at balance, that is, when the tracer or stylus is in its neutral or balanced position, the E. M. F. fed to the amplifier 82, is that derived from the transformer 81 unmodified in any respect by the tracer and which in this instance is one (1) volt one thousand (1000) cycles. But whenever the stylus is displaced from its neutral position the induced voltage in the tracer pick-up coil modifies the output of the transformer being fed to the amplifier, to either add to or subtract therefrom.

The amplifier 82 has a gain of approximately twenty-four (24) so that relatively low voltage may be used in the tracer head, thereby limiting the power required to operate the tracer unit to a minimum.

The output of the amplifier 82 which is still a one thousand (1000) cycle current, is fed into a rectifier 83 through a step-down transformer 84. This transformer has a ratio of 2.4 to 1. Hence, the voltage of rectifier output for a balanced condition of the tracer is ten volts D. C.

Inasmuch as a differential of ten volts above and below a neutral or normal of ten volts is required to activate one or the other of the two Thyratrons, 75 and 76, the design of the tracer pick-up coil is such that its modification of the voltage induced in the secondary of transformer 81 causes the voltage at the output of the rectifier 83 to go to zero for a condition of upward unbalance and to twenty (20) volts for a condition of downward unbalance.

Thus, an E. M. F. ranging from zero to twenty (20) volts D. C. may be fed from the rectifier 83 into a phase shifting network 85. This network utilizes the twenty (20) volt differential coming from the rectifier 83 to shift the phase angle between the voltages impressed on the plates and grids of the Thyratrons 75 and 76, and make one or the other Thyratron conductive to operate the vertical feed motor in the proper direction and at the proper speed to have it correct the vertical position of the connected tracer and cutter heads in accordance with the change dictated by the pattern.

The general description thus far applied to the block diagram refers only to the vertical feed motor control. A somewhat similar system obtains for the control of the horizontal and cross feed motors. However, in this instance, the E. M. F. induced in the tracer pick-up coil alone is utilized so that in this case the output of the tracer pick-up coil is fed directly to an amplifier 86 (similar to the amplifier 82) which is coupled to a rectifier 87 (similar to the rectifier 83) through a step-down transformer 88 (similar to the step-down transformer 84).

As the controlling voltage in this case comes solely from the tracer pick-up coil, it follows that for a condition of balance at which time no E. M. F. is induced in the pick-up coil, the voltage of the rectifier output is zero and for a maximum condition of unbalance, either upward or downward, the voltage of the rectifier output is ten volts D. C. This voltage is fed into a phase shifting network 89, which utilizes the ten volt differential to control the Thyratron 78.

As long as a condition of balance exists, the Thyratron is left fully conductive; but if the stylus is displaced from its neutral or balanced position, the voltage of the output of the rectifier 87 rises proportionately and through the control of the phase shifting network, the feed Thyratron 78 is controlled to pass a lower average current and reduce the speed of the horizontal feed motor accordingly.

For a condition of maximum unbalance when the voltage of the rectifier 87 is ten volts D. C., the phase shifting network 89 renders the feed Thyratron 78 non-conductive; and at this time the brake Thyratron 77 should be conductive to apply a reverse impulse on the horizontal feed motor if the anti-hunt mechanism 69 so dictates.

The anti-hunt mechanism, it will be recalled, is used to supply E. M. F. in consequence to the rate of displacement taking place at the tracer or stylus. Its function with relation to the horizontal feed motor or the cross feed motor thus is to apply a reversing impulse on the motor through the brake Thyratron whenever an abrupt change in the pattern contour, as for instance, a vertical wall encounters the stylus. To this end the output of the anti-hunt mechanism is first amplified by an amplifier 90, and then fed through the phase shifting network 89 to the brake Thyratron.

In a similar manner any abrupt change which may occur in the pattern causes the anti-hunt mechanism to accelerate the vertical correction. To this end the output of the anti-hunt mechanism is amplified by the amplifier 91 and fed in to the phase shifting network 85 to accelerate its controlling effect on the Thyratrons 75 and 76.

The foregoing general description of the control system is do doubt sufficient to define the relationship of the tracer, which constitutes the subject matter of this application, to the control, but if more detailed information is desired, reference may be had to the aforesaid parent application, Serial No. 384,342, filed March 20, 1941. In any event, it will be apparent to those skilled in the art that this invention provides a tracer exceptionally well adapted for its use.

What we claim as our invention is:

1. In a duplicating machine of the character described: a tracer unit comprising a tubular support; a stylus having a stem extending through said tubular support; a flexible diaphragm mounting the stylus from said tubular support in a manner permitting axial and lateral displacement of the stylus; a lever pivotally mounted from the tubular support at a point remote from the diaphragm; means for translating either or both axial and lateral displacement of the stylus into rocking motion of said lever; a control transformer mounted adjacent to the pivoted lever; a movable armature for said control transformer driven by said lever to effect changes in the magnetic circuits of said control transformer; a second electrical control unit mounted adjacent to the pivoted lever; a movable activating element for said second control unit; and means connecting the movable activating element with the pivoted lever so that motion of the lever governs the functioning of said control transformer and control unit.

2. In a duplicating machine of the character described: a tracer unit comprising a tubular support; a stylus having a stem extending through said tubular support; a flexible diaphragm mounting the stylus from said tubular support in a manner permitting axial and lateral displacement of the stylus; a lever pivotally mounted from the tubular support at a point remote from the diaphragm; means for translating either or both axial and lateral displacement of the stylus into rocking motion of said lever; a control transformer mounted adjacent to the pivoted lever; and a movable armature for said control transformer driven by said lever to effect changes in the magnetic circuits of said control transformer.

3. In a duplicating machine of the character described: a tracer unit comprising a tubular support; a stylus having a stem extending through said tubular support; a flexible diaphragm mounting the stylus from said tubular support in a manner permitting axial and lateral displacement of the stylus; a lever pivotally mounted from the tubular support at a point remote from the diaphragm; means for translating either or both axial and lateral displacement of the stylus into rocking motion of said lever; a control transformer mounted adjacent to the pivoted lever; a fixed magnet adjacent said pivoted lever; and a coil connected with said lever and movable thereby into and out of said fixed magnet to generate an E. M. F. in the coil, the magnitude of which is dependent upon the rate of motion of the lever.

4. In a duplicating machine of the character described: a tracer unit comprising a tubular support; a control member; means movably mounting said control member adjacent to the tubular support for motion in a defined path; a stylus having a stem extending through said tubular support; means mounting the stylus from the tubular support for axial and lateral movement with respect to the support; a driving connection between the stylus and said control member for translating either axial or lateral movement of the stylus into motion of the control member whereby the position of the control member along its defined path of movement is a function of the position of the stylus; a control transformer mounted adjacent to said control member; a movable armature for said control transformer driven by the control member for effecting changes in the magnetic circuits of said control transformer; a second electrical control unit mounted adjacent to said control member; a movable activating element for said second control unit; and means connecting the movable activating element with said control element so that motion of the control member governs the functioning of said control transformer and control unit.

JAMES W. WILKIE.
EDMOND G. FRANKLIN.